O. W. HARTUNG.
STOP MECHANISM FOR PHONOGRAPHS.
APPLICATION FILED APR. 5, 1911.

1,016,563.

Patented Feb. 6, 1912.

Witnesses
Albert A. Hofmann
Elizabeth M. Brown

Inventor.
O. W. Hartung
By Edward N. Pagelsen, Attorney

UNITED STATES PATENT OFFICE.

OSCAR W. HARTUNG, OF DETROIT, MICHIGAN.

STOP MECHANISM FOR PHONOGRAPHS.

1,016,563.

Specification of Letters Patent.   Patented Feb. 6, 1912.

Application filed April 5, 1911.   Serial No. 619,187.

*To all whom it may concern:*

Be it known that I, OSCAR W. HARTUNG, a citizen of the United States, and a resident of Detroit, in the county of Wayne and State of Michigan, have invented a new and useful Stop Mechanism for Phonographs, of which the following is a specification.

This invention relates to means for stopping the record-supporting table of phonographs, gramophones and other sound reproducing instruments after they have made a predetermined number of revolutions, and its object is to provide a stop mechanism which can be set for any desired number of revolutions within its range without the necessity of altering the adjustment of any of its parts, but by merely positioning an indicator for the number of revolutions desired.

This invention consists, in combination with a spring actuated brake adapted to engage the supporting table of a sound reproducing instrument, and a lever to hold same in inoperative position, of a graduated dial, a pointer adapted to be swung over the dial to indicate the number of revolutions, a notched disk against which the lever presses and which holds the lever outward until the predetermined number of revolutions have been made by the table, a toothed wheel to turn the notched disk and pointer, and an operating device to actuate the toothed wheel, which device is operated by the mechanism which revolves the table that is to be stopped.

Figure 1:
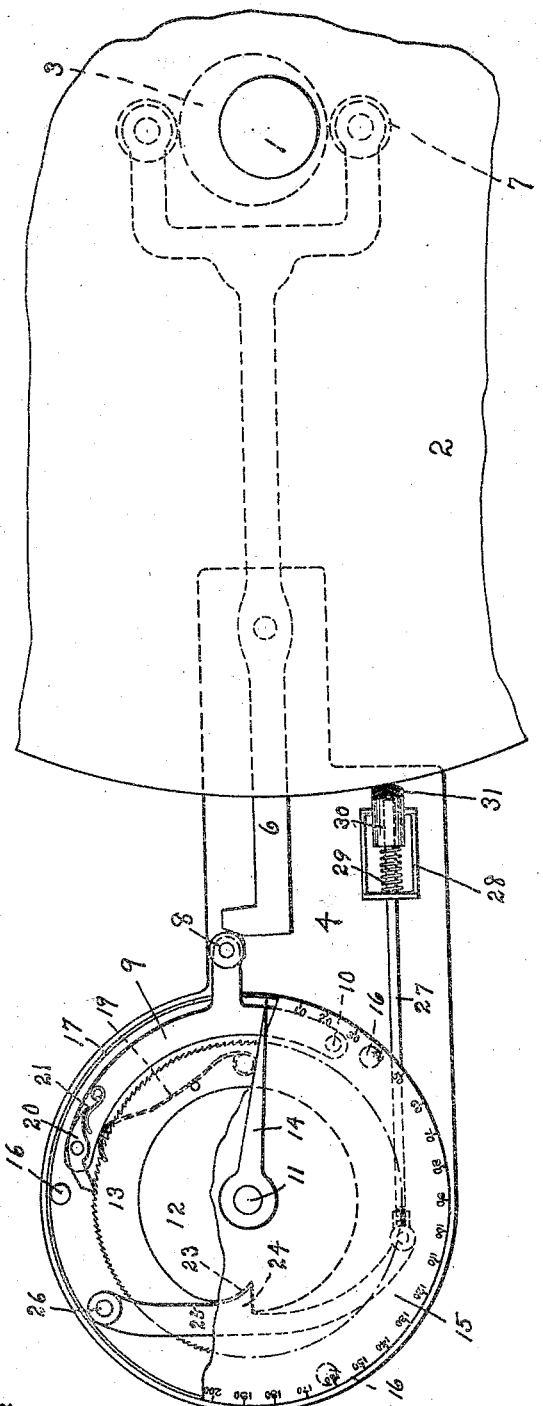
Figure 2:
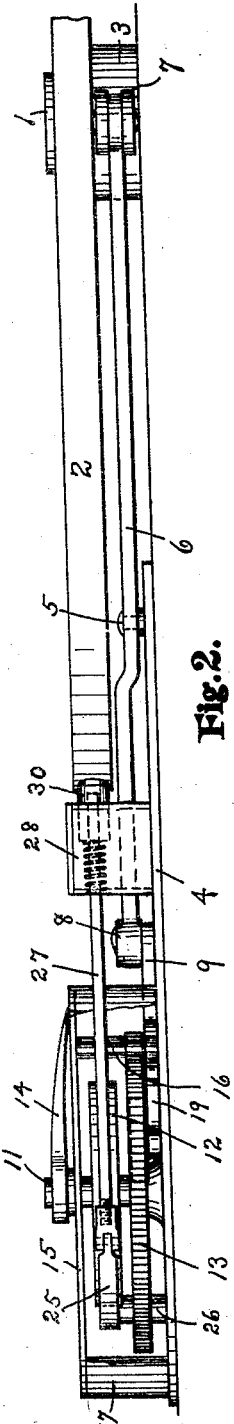

In the accompanying drawing, Figure 1 is a plan of the stop mechanism, a portion of the dial being broken away for clearness. Fig. 2 is an elevation of the same with the case broken away.

The same reference characters refer to like parts in both views.

Disk records for sound reproducing instruments vary in the number of spirals of record upon them, and it is desirable to stop their revolutions when the sound reproduction is completed, so as to prevent unnecessary wear of the stylus. The number of the engraved spirals may be indicated in any desired manner, either by placing a suitable character on the record or upon its envelop.

In the drawing, 1 is the main shaft of any sound reproducing machine which shaft carries a record table 2 and an eccentric 3. A plate 4 may be secured to the case of the driving mechanism of the instrument or connected thereto in any desired manner. Mounted on the pivot 5 carried by this plate is a lever 6, having anti-friction rollers 7 which engage the eccentric 3. The opposite end of the lever is inclined to form a cam which engages a roller 8 on a swinging arm 9, pivoted at 10 to the plate 4. Revolubly mounted on this plate is a shaft 11 to which is secured a notched disk 12, a toothed wheel 13, and a pointer 14. The pointer moves over a graduated dial 15, supported by posts 16, which dial furnishes a bearing for the upper end of the shaft 11. A shell 17 may inclose this mechanism, being provided with necessary apertures. The arm 9 is moved outward by any proper spring 19, and carries a pawl 20, held against the toothed wheel by a small spring 21.

The disk 12 has a notch 23 adapted to receive a tooth 24 on the lever 25, which lever is pivoted on the post 26. A rod 27 connects to the free end of this lever and its opposite end is slidable in a guide 28 in the form of a covered trough secured to the plate 4, in which is a spring 29 adapted to press the enlarged brake end 30 of the rod 27 against the record table 2. This enlarged end may be provided with a rubber cap 31.

The operation of the mechanism is as follows: When a record is placed on the table and the number of revolutions determined, the pointer 14 is turned (to the left) to the number desired. This will turn the disk 12 and thus press the tooth 24 and the lever 25 outward, pulling the brake 30 away from the record table 2, which may immediately begin to revolve. At each revolution, the eccentric 3 will swing the lever 6 and the arm 9, and the pawl 20 will turn the toothed wheel 13 one step. When the desired number of revolutions have been made, the pointer will have returned to zero on the dial and the notch 23 will have returned to the position shown in Fig. 1, when the spring 29 will be permitted to swing the tooth 24 on the lever 25 into the notch 23 and to press the brake 30 against the table to stop it.

Many changes in the details of this construction may be made within the scope of the claims without departing from the spirit of my invention.

Having now explained this construction and the mode of its operation, what I claim as my invention and desire to secure by Letters Patent is:—

1. In a stop mechanism for sound reproducing instruments, the combination of a notched disk, a lever mounted adjacent thereto and having a tooth adapted to enter the notch, a brake rod connected to said lever, a spring to move the rod to braking position when permitted by the disk, a graduated dial, a pointer movable over the dial to position the notched disk, and means actuated by the sound reproducing instrument to revolve said disk.

2. In a stop mechanism for sound reproducing instruments, the combination of a disk provided with a notch, a lever mounted adjacent thereto and having a tooth adapted to ride on the periphery of the disk and to enter the notch, a brake rod connected at one end to said lever, a guide for the other end of the rod, and a spring to press the end of the rod against the table of the sound reproducing instrument when permitted by the notched disk, and means connected to said table for turning said disk.

3. In a stop mechanism for sound reproducing instruments, the combination of a disk provided with a notch, a lever mounted adjacent thereto and having a tooth adapted to ride on the periphery of the disk and to enter the notch, a brake rod connected at one end to said lever, a guide for the other end of the rod, and a spring to press the end of the rod against the table of the sound reproducing instrument when permitted by the notched disk, means connected to said table for turning said disk, a graduated dial, and a pointer connected to said disk and movable over the dial to indicate the number of revolutions of the table desired.

4. In a stop mechanism for sound reproducing instruments, the combination of a vertical revoluble shaft, an indicator at the upper end thereof, a disk having a notch in its periphery and a toothed wheel secured to said shaft below the indicator, an arm and pawl to actuate the toothed wheel, disk and indicator, an operating lever engaging the arm and actuated by the mechanism of the sound reproducing instrument, a lever pivoted adjacent the disk and having a tooth adapted to enter said notch, a rod connected to the free end of the lever and having an enlarged end adapted to act as a brake for the mechanism of the instrument, and a spring to move the brake to operating position.

5. In a stop mechanism, for the tables of sound reproducing instruments, the combination of a spring pressed brake for said table, a lever connected thereto, a notched disk engaging said lever and normally holding the brake inoperative, means comprising an indicator for positioning said disk, and means actuated by the driving mechanism of the table for revolving said disk.

In testimony whereof I have signed this specification in the presence of two subscribing witnesses.

OSCAR W. HARTUNG.

Witnesses:
ELIZABETH M. BROWN,
EDWARD N. PAGELSEN.

---

Copies of this patent may be obtained for five cents each, by addressing the "Commissioner of Patents, Washington, D. C."